US006222830B1

(12) United States Patent
Padovani et al.

(10) Patent No.: US 6,222,830 B1
(45) Date of Patent: *Apr. 24, 2001

(54) COMMUNICATION SYSTEM USING REPEATED DATA SELECTION

(75) Inventors: Roberto Padovani; Bruce R. Meagher; Noam A. Ziv, all of San Diego, CA (US)

(73) Assignee: Qualcomm Incorporated, San Diego, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/519,670

(22) Filed: Aug. 25, 1995

(51) Int. Cl.[7] ....................................... H04Q 7/00
(52) U.S. Cl. ............................. 370/332; 455/506
(58) Field of Search .................... 370/320, 329, 370/335, 331, 334, 332, 509, 333, 508, 342, 503, 455, 375; 371/30, 31, 37.7, 37.11, 43.7, 43.8, 47.1, 61; 379/59, 60, 63; 455/33.1, 54.1, 33.2, 67.1, 67.3, 422, 501, 502, 506, 507, 517; 375/346, 348, 349; 714/746, 747, 758, 795, 796, 798, 784, 814

(56) References Cited

U.S. PATENT DOCUMENTS

| 5,091,918 | * | 2/1992 | Wales | 375/229 |
| 5,095,535 | * | 3/1992 | Freeburg | 455/278.1 |
| 5,208,816 | * | 5/1993 | Seshardi et al. | 371/43 |
| 5,260,943 | * | 11/1993 | Comroe et al. | 370/332 |
| 5,371,623 | * | 12/1994 | Eastmond et al. | 359/167 |
| 5,396,516 | * | 3/1995 | Padovani et al. | 375/225 |
| 5,406,613 | * | 4/1995 | Peponides et al. | 379/58 |
| 5,414,734 | * | 5/1995 | Marchetto et al. | 375/267 |
| 5,432,822 | * | 7/1995 | Kaewell, Jr. | 375/340 |
| 5,448,758 | * | 9/1995 | Grube et al. | 455/51.2 |
| 5,566,206 | * | 10/1996 | Butler et al. | 375/225 |
| 5,568,483 | * | 10/1996 | Padovani et al. | 370/468 |
| 5,677,934 | * | 10/1997 | Ostman | 375/349 |

FOREIGN PATENT DOCUMENTS

| 9501032 | 1/1995 | (WO) | H04L/25/02 |
| 9508888 | 3/1995 | (WO) | H04L/25/02 |

* cited by examiner

Primary Examiner—Wellington Chin
Assistant Examiner—Kwang B. Yao
(74) Attorney, Agent, or Firm—Philip R. Wadsworth; Kent D. Baker; S. Hossain Beladi

(57) ABSTRACT

A novel and improved system and method for assembling a single data stream from multiple instances of that data stream is described. Data transmitted from a cellular telephone subscriber unit is received by a set of base transceiver stations. Each base transceiver station performs various error detection procedures on segments of the data referred to as frames. These error detection procedures may include CRC check sum verification, Yamamoto metric calculation, re-encoded signal error rate calculation, or a combination thereof. The results of these error detection procedures are placed into a frame quality metric. The frame, frame quality metric, a time stamp and an address are placed into a packet that is transmitted from each base transceiver station to a base station controller which matches packets attempting to transmit the same information using the time stamp and selects one frame from the packets for further processing based on the associated frame quality metric.

28 Claims, 6 Drawing Sheets

COMMUNICATION SYSTEM USING REPEATED DATA SELECTION

BACKGROUND OF THE INVENTION

I. Field of the Invention

The present invention relates to the field of digital communications. More particularly, the present invention relates to a method and apparatus for delivering data within noisy and unpredictable communication environments.

II. Description of the Related Art

In noisy or unpredictable data transmission environments it is often useful to provide a degree of redundancy in the delivery of information or data between two or more systems. For example, in some wireless cellular telephone systems, information from a subscriber unit may be delivered through multiple base transceiver stations, or "cell sites", before being sent to the receiving communication system. The state of being in communication with multiple base transceiver stations within the context of a cellular telephone system is referred to as "soft hand-off." By providing multiple deliveries of information from the subscriber unit to the receiving communication system the probability of one instance of the information arriving successfully is increased, even as the position of the subscriber unit and surrounding environmental conditions change. In general, the redundant delivery of data between two systems is performed via multiple routes as in the soft hand-off situation, however, the multiple deliveries of data can also be performed over the same route at different times.

At some point in the course of redundant delivery of data a single instance of the data must be generated using the multiple instances of data available. One method of generating such a single instance of data is to combine or add the multiple instances together. Generating a single instance of the data in this way is especially useful in the context of a system incorporating the use of RF transmissions because combining these signals after they are transmitted can further enhance the accuracy of the data produced upon further processing. One drawback of generating a single instance of data in this way, however, is that once a single instance of data has been generated, additional data from other instances of the signal can not be added. When multiple signals are received at remote locations, however, as is the case with two separate base transceiver stations during soft hand-off, transmission of the signals in an unprocessed form to a location where they can be combined may be impractical or too costly. Thus, a method other than combining for generating a single instance of data from multiple instances is desired.

It is also useful within noisy and unpredictable transmission environments to incorporate the use of various error detection methods that allow the system receiving data to determine if any errors were introduced into the data during transmission. One method of error detection is to calculate a cyclical redundancy check (CRC) sum for a given segment of data, and to transmit the CRC along with that data. When the data is received, it can be checked against the CRC to verify its accuracy. While very effective, the use of a CRC check sum requires additional data be transmitted along with the original information and, therefore, either reduces the amount of information that can be transmitted, or requires additional bandwidth.

Another method of error detection is the calculation of a "Yamamoto metric" in conjunction with Viterbi encoded data. The calculation of a Yamamoto metric involves tracking the difference between the log likelihood of the most likely result and the next most likely result in a Viterbi decoding procedure. Viterbi decoding, well known in the art, involves performing multiple decodings of data and selecting the particular decoding that has the greatest log likelihood of accuracy. If the difference between the decoding that is most likely to be accurate and the next most likely remains greater than a predetermined amount there is greater confidence in the accuracy of the data, and the Yamamoto metric is set to success indicating an increased likelihood of accuracy. If the difference is less than the predetermined amount the Yamamoto metric is set to fail indicating the data is less likely to be accurate. The exact value of that predetermined amount must be determined via experimentation and the basis of the particular type of communication being performed. The Yamamoto metric is used and described in H. Yamamoto & K. Itoh, "Viterbi Decoding Algorithm for Convolutional Code with Repeat Request", IEEE Transactions on Information Theory, Vol. IT-26, No. 5, September 1980.

Still another method of error detection is the calculation of a re-encoded signal error rate (SER). The calculation of an SER involves re-encoding Viterbi decoded data and comparing this data with the encoded data originally received. The SER is usually a multi-bit value and it can be compared with other SER values calculated in response to other data transmissions to determine relative probability of error between the two transmissions. Of the three error detection methods discussed, CRC is the most likely to detect errors introduced during transmission and the SER is least likely, with the Yamamoto metric providing an intermediate probability of detecting errors.

The three error detection methods described above are each designed to operate on a single instance of data. In wireless cellular telephone systems and other systems incorporating the use of redundant data delivery, however, multiple instances of data are available for enhancing the accuracy of the information being delivered. These multiple instances of data provide an opportunity to increase the accuracy of the information ultimately produced that is not exploited by the above described error detection methods. Therefore, a method and system for generating a single instance of data from multiple instances of that data that incorporates the methods of error detection described above, and that exploits the availability of the multiple instances of data available in a communication system using redundant data delivery technology would be highly desirable.

SUMMARY OF THE INVENTION

The present invention is a novel and improved system and method for assembling a single data stream from multiple instances of that data stream. In the preferred embodiment of the invention, data transmitted from a cellular telephone subscriber unit is received by a set of base transceiver stations. Each base transceiver station performs various error detection procedures on segments of the data referred to as frames. These error detection procedures may include CRC check sum verification, Yamamoto metric calculation, re-encoded signal error rate calculation, or a combination thereof. The results of these error detection procedures are placed into a frame quality metric. The frame, frame quality metric, a time stamp and an address are placed into a packet that is transmitted from each base transceiver station to a base station controller which matches packets attempting to transmit the same information using the time stamp and selects one frame for further processing based on the associated frame quality metric.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

A system and method for communication incorporating the use of repeated data selection is provided. In the following description various protocols, systems and technologies are described in detail, including those associated with the use of Code Division Multiple Access (CDMA) wireless communication systems. It would be apparent to one skilled in the art that these protocols, systems and technologies are not necessary to practice the present invention and that the present invention is applicable in a variety of networking environments, as well as other wireless communication environments including satellite based telecommunications systems. Various other well known systems are described in block form. This is done in order to avoid unnecessarily obscuring the disclosure of the present invention.

Figure 1:
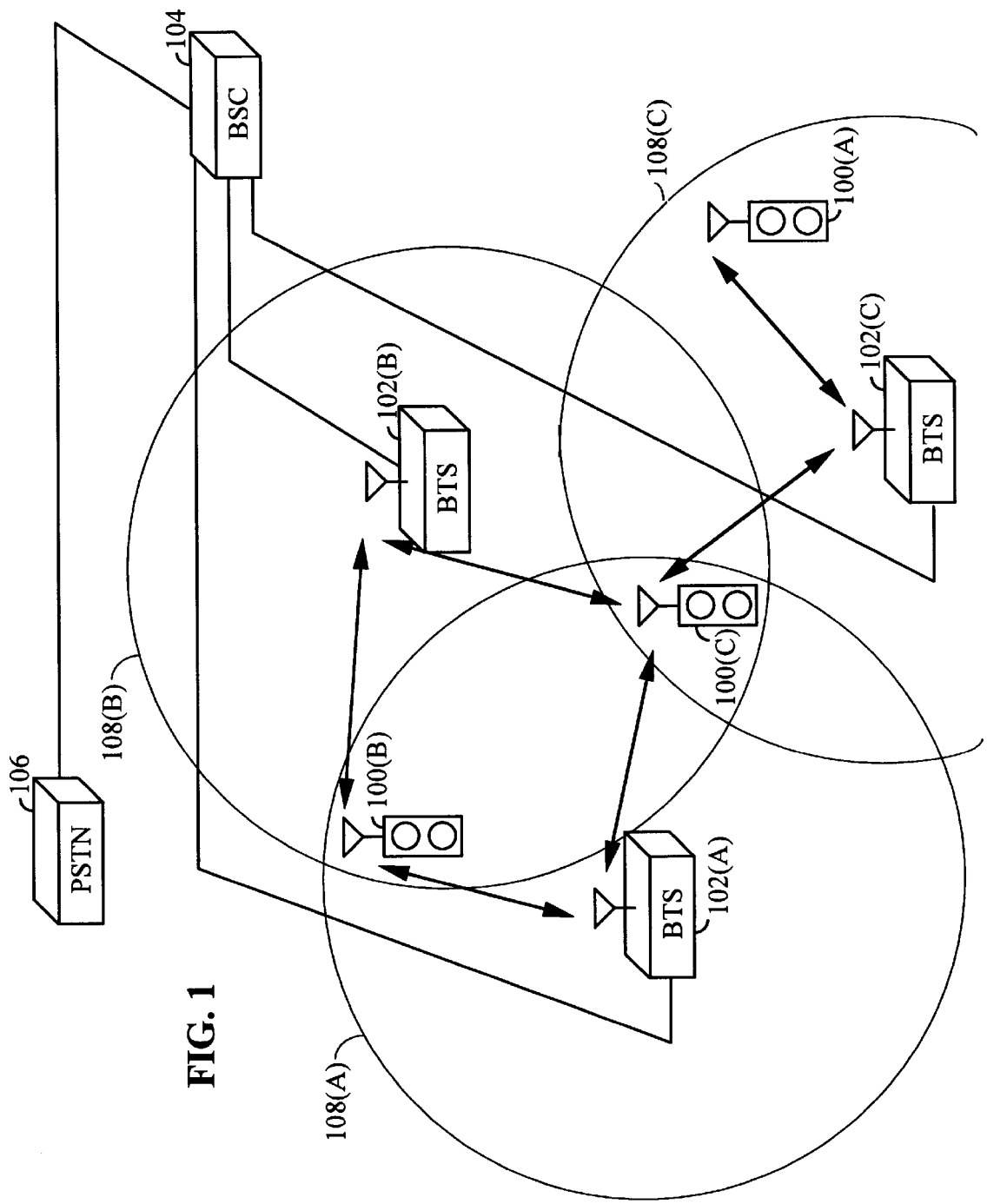
FIG. 1 is a perspective block diagram of a cellular telephone system configured in accordance with one embodiment of the invention.

FIG. 1 is a perspective block diagram of a digital wireless cellular telephone system configured in accordance with one embodiment of the invention. Subscriber units 100(A)–(C) interface with base transceiver station transceivers 102(A)–(C) through digitally modulated radio frequency (RF) signals. Each interface is comprised of a forward link and a reverse link. The forward link carries data from a base transceiver station transceiver 102 to a subscriber unit 100, and the reverse link from a subscriber unit 100 to a base transceiver station 102. Base transceiver stations 102(A)–(C) are coupled to base station controller (BSC) 104 via ground based wire connections, however, other methods for coupling base transceiver stations 102 to BSC 104 are also known including microwave links. BSC 104 in turn interfaces with standard based public switched telephone network (PSTN) 106 which is the traditional method of providing local telephone service. Coverage areas 108(A)–(C) are associated with base transceiver stations 102(A)–(C) respectively.

During operation, subscriber units 100 interface with various numbers of base transceiver stations 102 via RF signals depending on the particular subscriber unit's position relative to coverage areas 108. For example, subscriber unit 100(A) is located solely within coverage area 108(C) and therefore interfaces with base transceiver station 102(C) only. Alternatively, subscriber unit 100(B) is located within coverage area 108(A) and 108(B), and therefore interfaces with both base transceiver stations 102(A) and (B). Similarly, subscriber unit 100(C) is located within coverage areas 108(A), (B), and (C), and therefore interfaces with base transceiver stations 102(A), (B), and (C). A subscriber unit 100 in communication with more than one base transceiver station 102, as is the case with subscriber units 100(B) and (C), is said to be in "soft hand-off."

As each subscriber unit 100 changes position the number of base transceiver stations with which it interfaces changes as well according to the coverage areas 108 within which it is located. Hysterisis effects, however, may cause a subscriber unit 100 to continue to interface with a particular base transceiver station 102 as it moves outside the associated coverage area 108 for a certain amount of time. Additionally, it should be understood that coverage areas 108 are not fixed regions and their size and shape will vary with the number of subscriber units 100 located within a particular area and the number and proximity of neighboring base transceiver stations as well as other geographic and environmental conditions. In the preferred embodiment of the invention each subscriber unit 100 is limited to interfacing with six (6) base transceiver stations 108 at any given time, however, other numbers of interfaces are consistent with the operation of the invention.

Still referring to FIG. 1, subscriber units 100 perform extensive data processing in order to transmit voice and other audio information to base transceiver station 102 via the reverse link, i.e. the link from subscriber unit 100 to base transceiver stations 102. In the preferred embodiment of the invention, the audio information is input into subscriber unit 100 via a microphone and is digitally formatted at a 8 khz sampling rate with each sample generating 8 bits of data. The resulting information is organized in 20 msec segments, called "frames" each frame containing 1280 bits of data corresponding to 160 samples. Each frame is variable rate vocoded to reduce the amount of data necessary for storage and transmission. There are four rates at which the frames are vocoded, with the highest rate being used when the amount of audio information generated during the 20 msec time segment associated with that frame is above a certain level, and the lower rates being used when less information is present. The four rates are generally referred to as "full rate", "half rate", "quarter rate", and "eighth rate" respectively because in the preferred embodiment each frame contains half as much data as the next, and therefore transmits data at half the rate. The actual data rate may vary in accordance with the requirements of the application, however, full rate frames of 8.6 kbits/sec as well as 13.0 kbits/sec are well known in the art.

After a frame is vocoded, quality indication information, which generally takes the form of CRC data, is appended to the frame. In some embodiments of the invention CRC data is appended to only the full and half rate frames. In other embodiments CRC data is appended to frames of every data rate. The actual data rate of a full rate frame, and the level of accurate data delivery required, will determine the proper type and amount of quality indication information. After the quality indication information is appended to the frame as described above, eight tail bits, which are all zeros in the preferred embodiment, are also appended to each frame no matter what the frame rate. Frames may also carry non-audio digital information such as that from a computer system coupled to subscriber units 100. For non-audio information the step of vocoding is omitted and the digital information is simply placed into frames that are specially marked. In the preferred embodiment full rate frames specially marked may also contain a combination of vocoded data and digital data.

Viterbi convolutional coding is performed on each variable rate frame whether it contains vocoded data, digital data, or a combination thereof. For reverse link transmissions the rate of convolutional encoding is ⅓ yielding three code symbols for each data bit. The tail bits provide independence between the frames for purposes of convolutional encoding since such encoding makes the code symbols presently being generated dependent on the state of the data previously generated. After convolutional encoding, data in the lower rate frames are duplicated to generate data sufficient to fill an entire 20 msec time span. For example, the quarter rate frame is duplicated four times. Each frame is then block interleaved to reduce susceptibility to fade conditions. When the data is ultimately transmitted the frame will be gated in pseudo-random fashion such that only one instance of the data is transmitted.

Once block interleaved, the reverse link frame is 64-ary orthogonally modulated. That is, one of sixty-four possible orthogonal modulation symbols, each symbol consisting of sixty-four modulation chips, is transmitted for every six code symbols. The sixty-four orthogonal modulation symbols are referred to as "Walsh symbols" and each chip within the Walsh symbol a "Walsh chips". The Walsh symbols are then direct sequence spread spectrum modulated using a pseudorandom (PN) "long code" that is unique to each subscriber unit 100 at ratio of four long code chips to every Walsh chip. The long code for each subscriber unit 100 is known by each base transceiver station 102. The long code spreaded data is then spread again in quadrature using two $2^{15}$ bit pseudorandom (PN) codes, referred to as the I code and the Q code, and upconverted to a predetermined RF frequency range for transmission to base transceiver station 102 via the reverse link interface. The I and the Q codes are the same for the reverse link signals from each subscriber systems 100.

Figure 2:
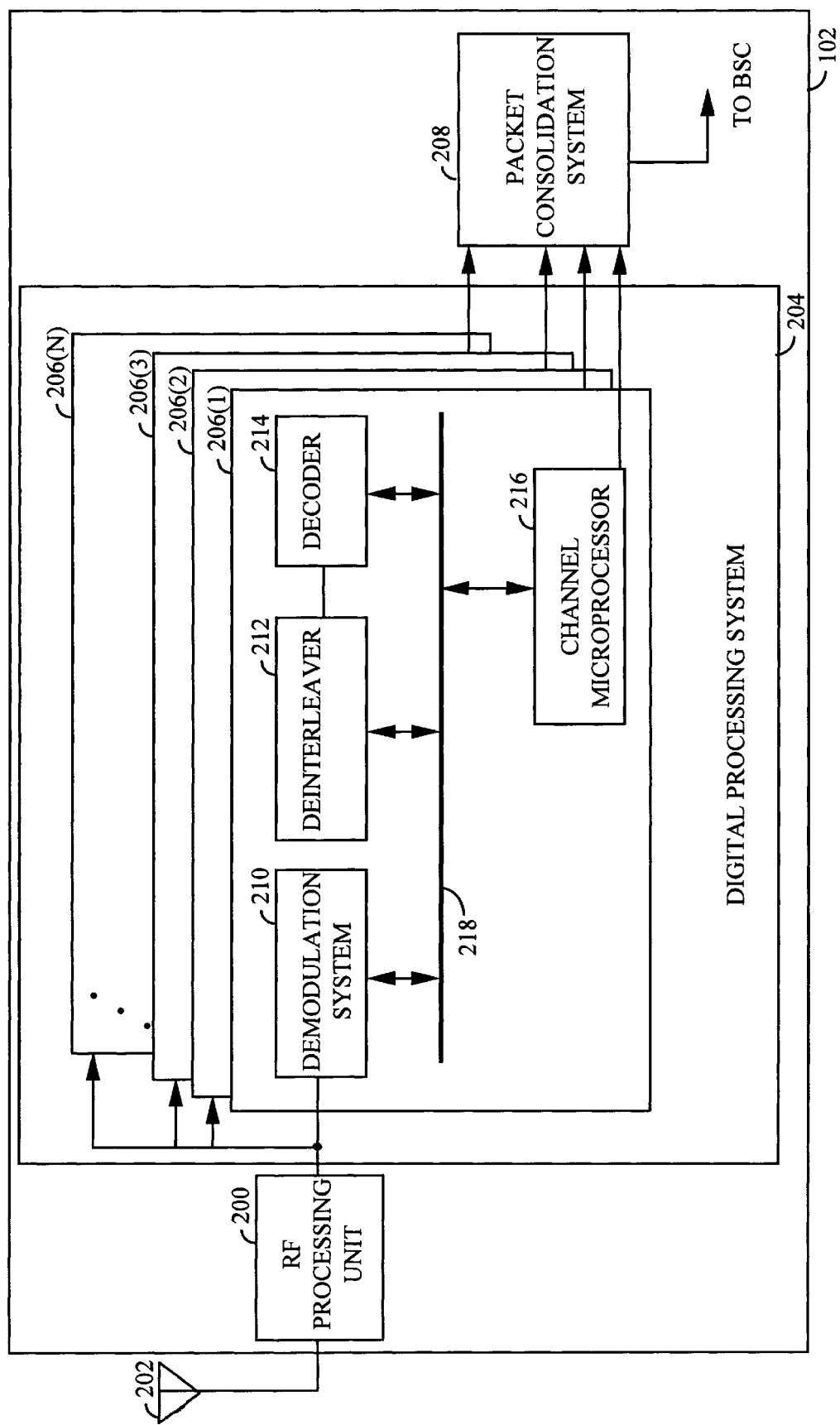
FIG. 2 is a block diagram of a base transceiver station configured in accordance with one embodiment of the invention.

FIG. 2 is a block diagram of a base transceiver station transceiver 102 (FIG. 1) configured in accordance with one embodiment of the invention. RF processing unit 200 is coupled to antenna system 202 and digital processing system 204. Digital processing system 204 is coupled to packet consolidation system 208 and is comprised of a set of channel processing systems 206(1)–(N). Packet consolidation system 208 is coupled to BSC 104 which is coupled to PSTN telephone network 106, both of FIG. 1. Channel processing system 206(1) is shown in additional detail and is comprised of demodulation system 210, deinterleaver 212, decoder 214, and channel microprocessor 216 all coupled together via channel bus 218, and every other channel processing system 206(2)–N) is similarly configured in the preferred embodiment of the invention. While each channel processing system 206 is shown to have only a single demodulator system 210, deinterleaver 212, and decoder 214, other embodiments of the invention may have multiple instances of these systems coupled to channel bus 218, each processing a single reverse link signal and sharing channel microprocessor 216.

During operation, each base transceiver station 102 receives a set of reverse link signals from the set of active subscriber units 100 located within the associated coverage area 108 (FIG. 1) via antenna system 202. The set of reverse link signals are downconverted and digitized by RF processing unit 200 and passed to digital processing system 204. Within digital processing system 204 the digitized signals are provided to each of channel processing systems 206 which isolates a sub-set of the reverse link signal associated with a particular subscriber unit 100 (FIG. 1) and performs signal processing sufficient to generate a best estimate of the original data frames generated by the original subscriber unit 100.

In an exemplary reverse link signal processing operation performed within channel processing system 206(1), demodulation system 210 demodulates samples from the entire set of reverse link signals using the common I and Q codes time offset for the expected arrival of the signal which is determined via a time tracking mechanism. The resulting data is then further demodulated using the pseudorandom long code corresponding to a particular subscriber unit 100. The use of the time offset during the I and Q demodulation, and the demodulation with a particular pseudorandom long code, isolates the information generated by a single subscriber unit 100 from the other subscriber units 100. In the preferred embodiment of the invention multiple instances of the signal for a particular subscriber unit 100, often referred to as multipath signals, are demodulated with these multiple instances being created by reflections of the reverse link RF signal and other natural signal phenomena. Once a particular instance of the signal has been demodulated, a fast Hadamard transform is performed to generate a set of estimation data, with the set of estimation data indicating the likelihood of a particular Walsh symbol being transmitted. The estimation data from each instance of the signal received is summed, and that summed estimation data is used to determine an estimate or best guess set of six code symbols transmitted.

The six code symbols are then passed to deinterleaver 212 which accumulates and deinterleaves the data. The deinterleaved data is passed via a direct connection to decoder 214 which convolutionally decodes the deinterleaved data at each of the possible data rates which in the preferred embodiment is four, i.e. full rate, half rate, quarter rate, and eighth rate, and calculates success indication data which is passed to channel microprocessor 216. The form of this success indication will depend on the type and amount of quality indication information transmitted with each frame. In general, if a particular frame was transmitted with CRC data the success indication information will take the form of a CRC success indication bit. If the frame was transmitted without CRC data the success indication information will take the form of a Yamamoto success bit.

The calculation of a CRC success indication bit and a Yamamoto success bit on the same may also be performed, although such calculation is generally not preferred as the CRC success indication bit is much more likely to be accurate. Additionally, a re-encoded signal error rate (SER) is calculated for frames of every rate by re-encoding the decoded data and comparing the results with the data originally received. Channel microprocessor 216 determines the most likely data rate of the frame based on this success indication information, and selects the associated set of demodulated data with any CRC success indication information being given the greatest consideration, any Yamamoto metric information receiving the next highest amount of consideration, and the SER information being given the least amount of consideration. One example of such processing is described in detail in co-pending U.S. Pat. No. 5,566,206 entitled "METHOD AND APPARATUS FOR DETERMINING DATA RATE OF TRANSMITTED VARIABLE RATE DATA IN A COMMUNICATIONS RECEIVER" issued Oct. 15, 1996 and assigned to the assignee of the present invention.

Channel microprocessor 216 then generates a data packet that includes the data frame selected on the basis of the success indication information, a frame quality metric (FQM), an address, and a time stamp. The address is a value that allows the packet to be directed to the appropriate destination and the time setup indicates the time at which the packet was processed. The FQM is comprised of the success indication information associated with the selected frame arranged in a predetermined fashion. In general, any CRC success bit associated with the selected frame, if such a CRC success bit exists, is placed in the most significant location within the FQM, any Yamamoto success indication bit associated with selected frame, if such a Yamamoto success indication bit exists, is placed in a location within the FQM having intermediate priority, and the SER value associated with selected frame is subtracted from the largest binary value with the same number of bits used to represent the SER and the result placed in the least significant location within the FQM. For an eight bit SER the hex value is 0xFF and for a seven bit SER 0x7F. In embodiments of the invention in which CRC success indication bits and Yamamoto metric success bits are calculated for some rate frames but not others, a zero is generally placed in the location reserved for the particular type of success indication information when it is not available for a given frame. In embodiments of the invention that do not incorporate the use of a Yamamoto metric, no location within the FQM is reserved for a Yamamoto success indication bit.

The data packets from each digital processing system 206 are forwarded to packet consolidation system 208 which in turn transmits the packets to BSC 104 of FIG. 1 on a telecommunications line such as a T1or E1 link, both well known in the art. Since each base transceiver station 102 of FIG. 1 performs the above described reverse link signal processing, multiple instances of the data transmitted in a packet will be received by BSC 104 when the associated subscriber unit 100 is in soft hand-off.

Figure 3:
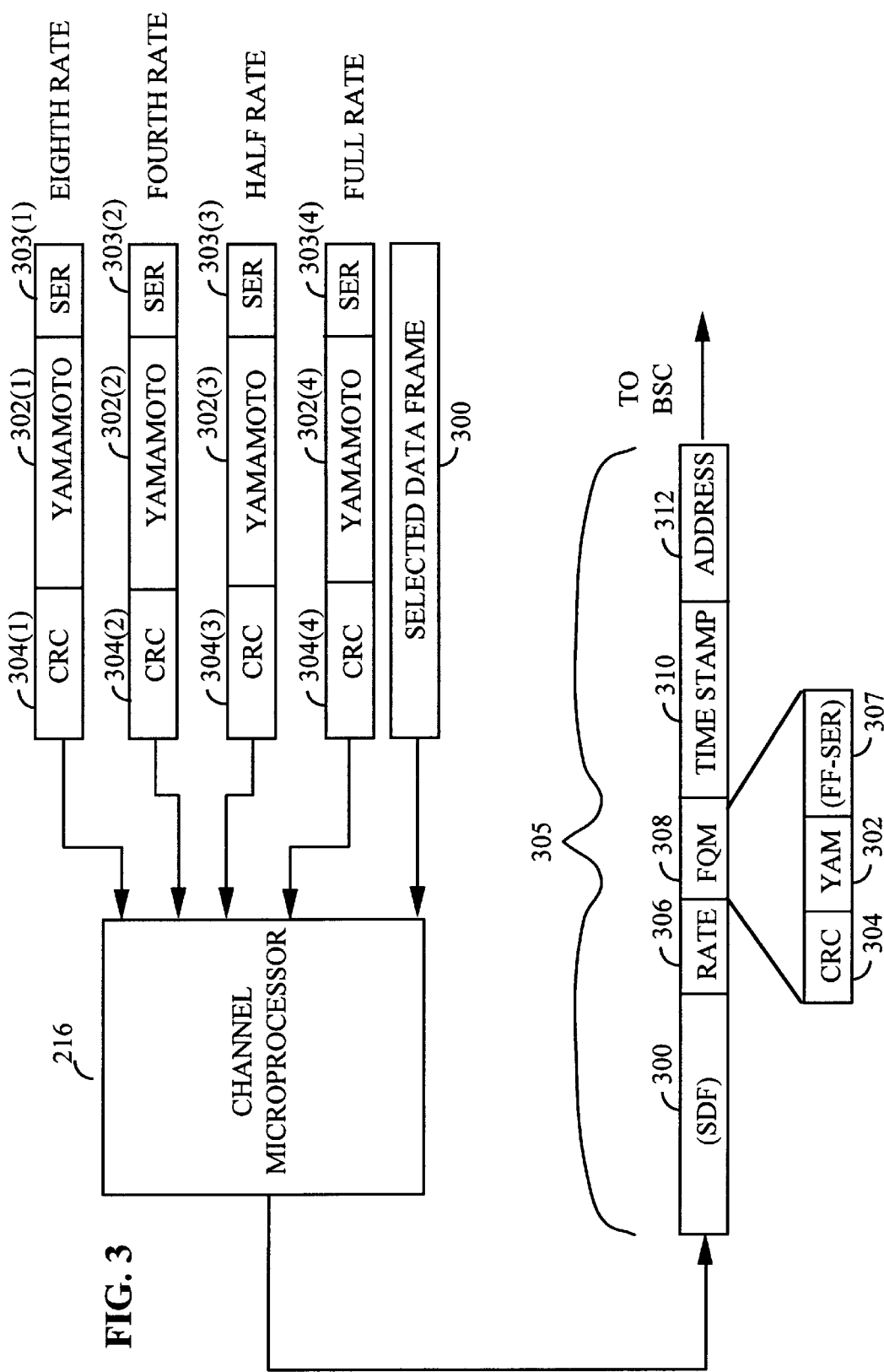
FIG. 3 is a block diagram illustrating the flow of data associated with the processing of a frame within a channel processing system.

FIG. 3 is a block diagram illustrating the flow of data associated with the processing of a frame within a given channel processing system 206 in accordance with one embodiment of the invention. Yamamoto success indication bits 302(1)–(4), serial error rate information 303(1)–(4) and CRC success indication bits 304(1)–(4) associated with the full, half, fourth, and eighth rate decodings respectively are received by channel microprocessor 216. In alternative embodiments of the invention Yamamoto success information and CRC success indication may only be calculated for some of the decoding rates, and in still other embodiments the use of Yamamoto success information may be omitted entirely, and therefore would not be provided to channel microprocessor 216 as shown. In response to this information, channel microprocessor 216 selects selected data frame 300 and generates packet 305. Packet 305 is comprised of the selected frame 300, rate information 306, frame quality metric 308, time stamp 310 and address 312. Time stamp 310 is preferably a two bit number that is cycled through repeatedly to allow a particular frame to be distinguished from the previous and following frames. In one embodiment of the invention FQM 308 is comprised of the CRC success indication bit 304 with the selected frame, the Yamamoto success indication bit 302 associated with the selected frame, and the SER success indication information associated with the selected frame subtracted from the value 0xFF placed in location 307. If there is no CRC or Yamamoto success indication information associated with selected frame 300 a value a zero is inserted within FQM 308 unless the use of the Yamamoto metric is entirely omitted, in which case no location within FQM 300 is used and therefore no value is inserted, and FQM 308 will consist of only CRC 304 and 0xFF–SER at location 307. An FQM 308 consisting only of a CRC value is also contemplated. Packet 305 is then transmitted to BSC 104 of FIG. 1.

Figure 4:
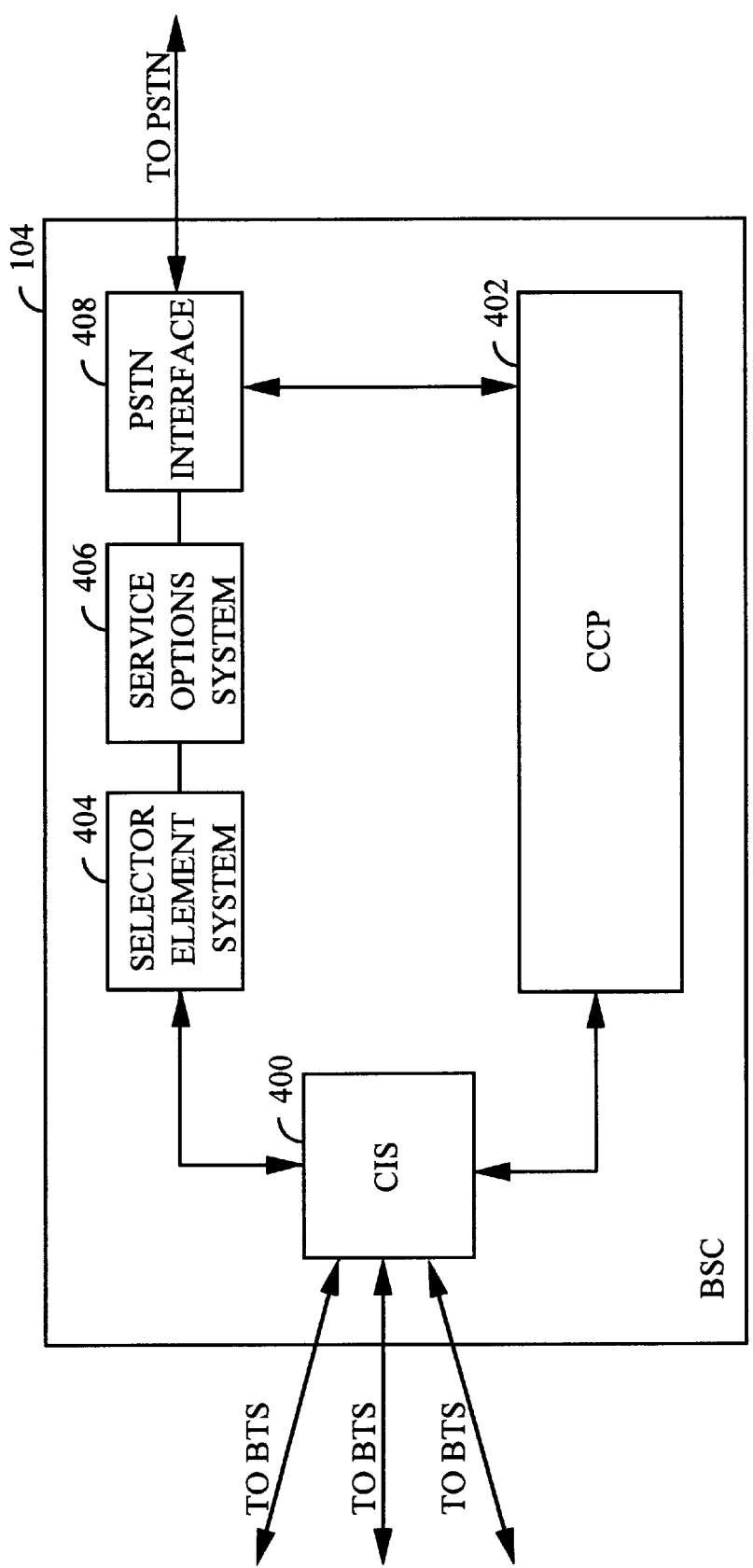
FIG. 4 is a block diagram of a mobile telephone switching office when configured in accordance with one embodiment of the invention.

FIG. 4 is a block diagram of BSC 104 (FIG. 1) configured in accordance with one embodiment of the invention. CDMA interconnect subsystem (CIS) 400 is coupled to call control processor (CCP) 402 and to selector element bank 404. Service options system 406 is coupled between selector element system 404 and PSTN interface 408 which provides the interface with PSTN 106 of FIG. 1. CCP 402 is coupled to PSTN interface 408. While various other well known systems are incorporated into BSC 104, these systems are omitted because they are not particularly relevant to the present invention. Additionally, while the systems making up BSC 104 are shown in a manner that indicates that they are in the same location, they may be located in other remote connections and coupled together via high speed connections well known in the art.

The operation of BSC 104 is controlled by CCP 402. For a call involving a subscriber unit 100, CCP 402 establishes a selector element resource within selector element system 404 to process the information generated by the call, and instructs CIS 400 to direct packets associated with that call to that selector element resource. Service options system 406 is also configured by CCP 402 to provide various types of call processing services such as vocoding and de-vocoding as well as other signal processing. PSTN interface 408 provides a standard interface to service options system 406 so that it may interact with various types of PSTN interfaces including T1 and E1 connections well known in the art. Additionally, PSTN interface 408 may provide various types of supplemental telecommunication services such as call waiting, call forwarding, and conference calling.

Packets 305 (FIG. 3), and the selected frame 300 contained therein, are transmitted through base transceiver stations 102 (FIG. 1) and CIS 400 to the appropriate selector element resource within selector element system 404 using address 312 (FIG. 3) also contained in packet 305. The selector element resource monitors the state of the telephone call and takes various actions depending on whether the call is in a soft hand-off situation. If the subscriber unit 100 is located with a single coverage area 108 (FIG. 1), the associated telephone call will not be in a soft hand-off state. In response, the selector element resource will expect to receive a single instance of each reverse link frame generated by that subscriber unit 100 and therefore a single packet 305. Since only one packet is expected, the selector element resource will transmit the frame 300 associated with the packet 305 to the appropriate next destination immediately upon reception of that packet 305. In the preferred embodiment of the invention the appropriate next destination is the service options system 406 for purposes of further signal processing if the phone call was with a PSTN telephone, or back to CIS 400 if the phone call was with another subscriber unit 100. Other embodiments of the invention may provide for additional or alternative routing schemes.

If the subscriber unit 100 associated with the telephone call is in a soft hand-off situation, and therefore engaged in multiple reverse link interfaces with multiple base transceiver stations 102, the selector element resource will expect to receive multiple packets 305 and therefore multiple instances of each selected frame 300, via CIS 400. Upon receiving the first packet 305 to arrive, the selector element resource will wait for a predetermined period of time for the additional expected packets 305 to also arrive. If all the expected packets 305 arrive the selector element resource will determine which packet 305 has the frame quality metric 308 with the highest value. Based on this determination, the selector element resource will continue to process the frame associated with the frame quality metric having the highest value. The other frame is discarded.

If the total number of packets 305 that arrive within the predetermined period of time is less than the expected number of packets, the selector element resource determines the packet with the greatest associated frame quality metric 308 from those received. If only a single packet 305 is received, then the frame 300 associated with that packet 305 is selected. If no frame arrives, the selector element resource generates and forwards an erasure frame. This selection process is performed whenever multiple instances of the same frame 300 are received, thereby generating a single stream of data comprised of the best frame 300 from the set of frames generated from the multiple reverse link interfaces in which the subscriber unit 100 in soft hand-off is engaged. Time stamp 312 (FIG. 3) is used by the selector element resource to ensure frames associated with the same set of data are being compared.

Figure 5:
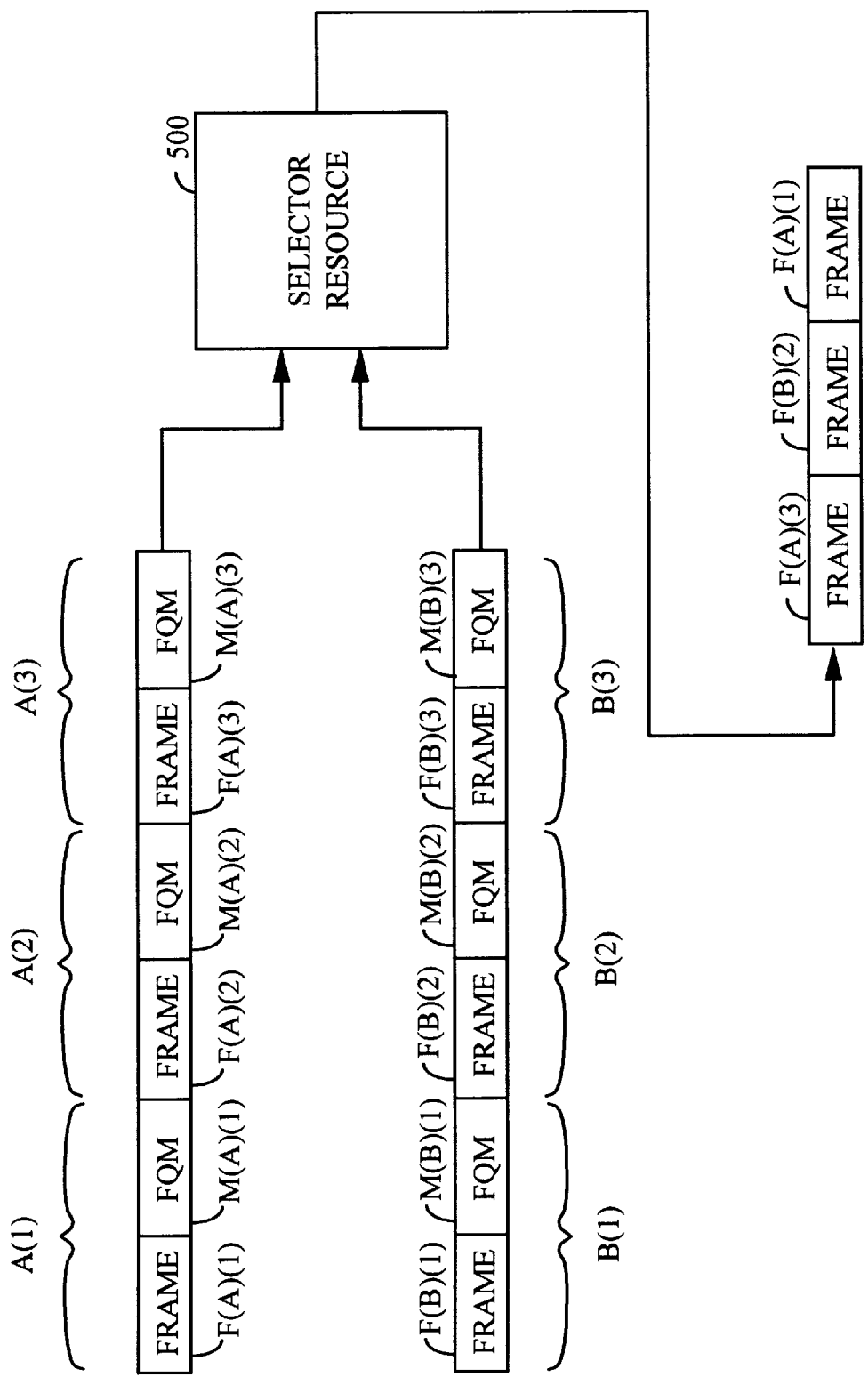
FIG. 5 is a block diagram of a selector element bank and service options element configured in accordance with one embodiment of the invention.

FIG. 5 is a block diagram that illustrates the processing of two packet streams from a wireless subscriber unit 100 in soft hand-off in accordance with one embodiment of the invention. Packet stream A is comprised of packets A(1)–(3) which in turn are comprised of frames F(A)(1)–(3) frames A(1)–(3) and associated frame quality metrics (FQM) M(A)(1)–(3). Data stream B which in turn is comprised of packet frames F(B)(1)–(3) and associated FQM's MB(1)–3). The address and time stamp information is not shown for ease of drawing. Selector element resource 500 receives data stream A and data stream B and generates output data stream C based on FQM's M(A)(1)–(3) and M(B)(1)–(3). In the exemplary processing shown, output data stream C is comprised of frame F(A)(1) from data stream A, followed by frame F(B) (2) from data stream B, followed by frame F(A)(3) from data stream A. This corresponds to FQM M(A)(1) having a higher value than FQM M(B)(1), FQM M(B)(2) having a higher value than FQM M(A)(2), and FQM M(A)(3) having a higher value than FQM M(B)(3). Thus a single stream of data is generated from multiple streams of data based on frame selections performed according to the associated frame quality metric values.

Figure 6:
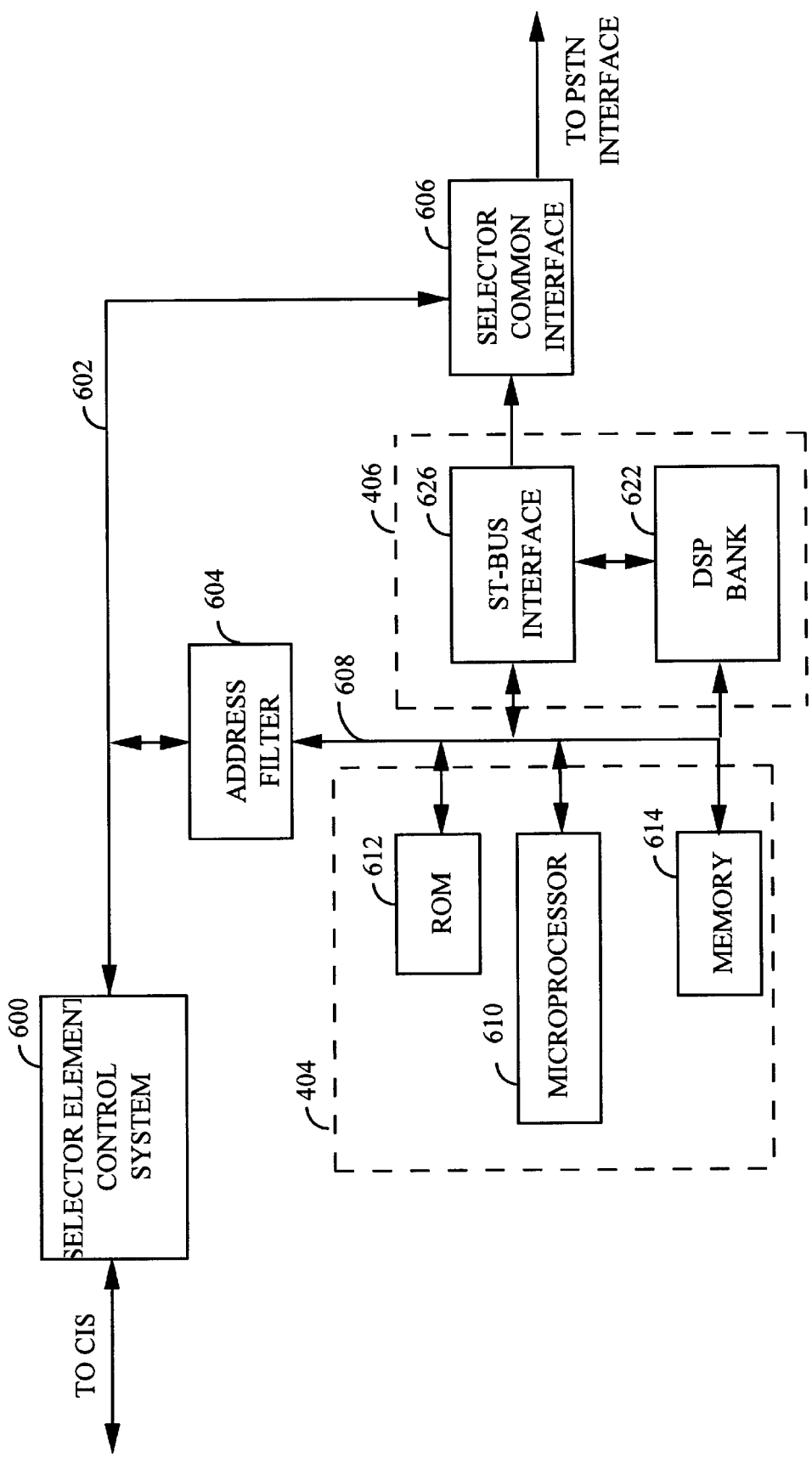
FIG. 6 is a block diagram illustrating the processing of two data streams in accordance with one embodiment of the invention.

FIG. 6 is a block diagram of selector element bank 404 and service options element 406 of FIG. 4 configured along with various interface systems in accordance with one embodiment of the invention. Selector element system controller 600 is coupled to traffic bus 602 and to CIS 400 of FIG. 4. Traffic bus 602 is coupled to address filter 604 and selector common interface 606. Selector element system 404 is coupled to address filter 604 via peripheral bus 608 and is comprised of microprocessor 610 read only memory (ROM) 612, memory 614. Service options system 406 is also coupled to peripheral bus 608 and is comprised of ST-bus interface 626, and digital signal processor (DSP) bank 622. ST-bus interface is coupled to selector common interface 606. While only one instance of selector element system 404 and service options system 406 are shown, in the preferred embodiment multiple instances of these systems are coupled to traffic bus 602. Additionally, traffic bus 602 is comprised of a transmit and a receive channel which are not shown for ease of drawing.

During operation, configuration commands from CCP 402 are passed through selector element control system 600, traffic bus 602, address filter 604, and peripheral bus interface 608 to microprocessor 610. Microprocessor 610 responds by configuring itself and memory 614 to generate a selector element resource that is assigned to a particular telephone call. This configuration is done using software instructions represented by electrical charges within ROM 612, as well as other instruction supplied from other sources within BSC 104. In the preferred embodiment memory 614 is comprised of semiconductor based random access memory (RAM) including static RAM although other types of memory are contemplated. As packets 305 (FIG. 3) associated with the telephone call are received they are directed via address filter 604 to microprocessor 610. If two packets 305 are received having an instance of the same frame as indicated by time stamp 310 (FIG. 3) the frame quality metric 308 contained in each packet are compared by the selector element resource, and the frame associated with the greatest frame quality metric is selected for further processing.

In the preferred embodiment of the invention this further processing entails passing the frame to DSP bank 622 for de-vocoding if the frame contains vocoded data and the requested call is directed to a wire base telephone. If the frame contains digital data it is passed directly to ST-bus interface 626. After being de-vocoded by DSP bank 622, the de-vocoded data is also passed to ST-bus interface 626 which introduces the data to PSTN interface 408 via selector common card 606. If the telephone call is directed to another wireless subscriber unit that is part of the cellular telephone system controlled by BSC 104 shown in FIG. 4, the frame selected for further processing is directed back to CIS 400 via peripheral bus interface 608 address filter 604 and selector bank control system 600. The data is not de-vocoded in this case because the receiving wireless subscriber unit is capable of processing vocoded data. DSP bank 622 contains multiple digital signal processors as well as small amounts of local memory for storage of the incoming data.

The use of the above described system and method to transmit data increases the likelihood of accurate transmission of data. This is because the system and method described incorporates the use of a frame quality metric that increases the probability that a frame transmitted without error, or with the least amount of error, will be selected from a set of frames that are supplied to generate a final data stream. Additionally, the above described method and system allows for efficient transmission and processing of this data within a wireless telecommunications system. This is because each instance of the radio frequency reverse link signal received is digitally processed within each base station 102 to generate a single vocoded data stream before being transmitted to BSC 104 over the expensive T1 and E1 connections for selection using the associated FQM 308 thus saving telecommunications resources.

The configuration frame quality metric described above further facilitates the transmission of data by having the CRC success indicator in the most significant location, that is the highest order bits of the binary value that is the frame quality metric, ensuring that frames having data that properly checks with the associated CRC value are chosen over frames that do not. This includes frames for which a successful Yamamoto metric value is calculated, if the use of the Yamamoto metric is incorporated into the particular embodiment of the invention. Choosing the frame that successfully checks with the associated CRC value over a frame that successfully generates a positive Yamamoto metric is appropriate because a CRC check sum is a better method of detecting transmission errors than the Yamamoto metric. Correspondingly, the frame quality metric has any Yamamoto metric success bit placed at a more significant location within the frame quality metric than the SER, thereby also increasing the probability that the most accurate frame is selected. This is because the Yamamoto metric is a better indicator of accuracy than the SER. Therefore, the frame most likely to have been transmitted without error is selected each time.

Thus, a system and method for assembling a data stream from a set of data streams is described. It will be apparent that various other alternative embodiments of the invention may be practiced. The exemplary embodiment described above is provided for purpose of demonstration, and should not be taken as limiting the scope of the invention which is set forth in the following claims.

We claim:

1. A method for communicating data over multiple wireless links comprising the steps of:
    (a) generating a sequence of frames of data;
    (b) transmitting the sequence of frames of data over the multiple wireless links;
    (c) receiving multiple instances of the transmitted sequence of frames of data;
    (d) encoding a time stamp and calculating a quality metric for each one of the frames of data in each one of the received instances;
    (e) selecting only one of the frames of data having the same time stamp based on the quality metrics for the frames of data having the same time stamp; and
    (f) outputting the selected frame of data.

2. The method as set forth in claim 1 wherein, for each one of the frames of data in each one of the received instances, step (d) is comprised of one or more of the steps of:
    generating CRC success indication data bits;
    generating Yamamoto success indication data bits; and
    generating signal error rate data bits.

3. The method as set forth in claim 2 wherein, for each one of the frames of data in each one of the received instances, step (d) includes the step of:
    assembling a combined quality metric by combining the CRC success indication data bits, if generated, with the Yamamoto success indication data bits, if generated, and with the signal error rate data bits, if generated.

4. The method as set forth in claim 3 wherein, for each one of the frames of data in each one of the received instances, the step of assembling a combined quality metric includes the step of:
    inserting the CRC success indication data bits, if generated, into a most significant bit portion of a combined quality metric data field;
    inserting the Yamamoto success indication data bits, if generated, into a middle bit portion of the combined quality metric data field; and
    inserting the signal error rate data bits, if generated, into a least significant bit portion of the combined quality metric data field.

5. The method as set forth in claim 1 wherein step (a) includes the step of:
    encoding CRC check sum bits into at least some of the frames of data.

6. The method as set forth in claim 1 wherein step (e) is comprised of the step of:
    selecting the one frame having the highest quality metric.

7. A system for communicating data over multiple wireless links comprising:
    (a) means for generating a sequence of frames of data;
    (b) means for transmitting the sequence of frames of data over the multiple wireless links;
    (c) means for receiving multiple instances of the transmitted sequence of frames of data;
    (d) means for encoding a time stamp and calculating a quality metric for each one of the frames of data in each one of the received instances;
    (e) means for selecting only one of the frames of data having the same time stamp based on the quality metrics for the frames of data having the same time stamp; and
    (f) means for outputting the selected frame of data.

8. The system as set forth in claim 7 wherein the means for encoding a time stamp and calculating a quality metric includes one or more of:
    means for generating CRC success indication data bits;
    means for generating Yamamoto success indication data bits; and
    means for generating signal error rate data bits.

9. The system as set forth in claim 8 wherein the means for encoding a time stamp and calculating a quality metric also includes;
    means for assembling a combined quality metric by combining the CRC success indication data bits, if generated, with the Yamamoto success indication data bits, if generated, and with the signal error rate data bits, if generated.

10. The system as set forth in claim 9 wherein the means for encoding a time stamp and calculating a quality metric includes
    means for inserting the CRC success indication data bits, if generated, into a most significant bit portion of a combined quality metric data field;
    means for inserting the Yamamoto success indication data bits, if generated, into a middle bit portion of the combined quality metric data field; and
    means for inserting the signal error rate data bits, if generated, into a least significant bit portion of the combinted quality metric data field.

11. The system as set forth in claim 7 wherein the means for generating a sequence of frames of data includes:
    means for encoding CRC check sum bits into at least some of the frames of data.

12. The system as set forth in claim 7 wherein the means for selecting includes:
    means for selecting the one frame having the highest quality metric.

13. A method for receiving a sequence of frames of data transmitted over multiple links comprising the steps of:
    (a) receiving multiple instances of the transmitted sequence of frames of data;
    (b) encoding a time stamp and calculating a quality metric for each one of the frames of data in each one of the received instances;
    (c) selecting only one of the frames of data having the same time stamp based on the quality metrics for the frames of data having the same time stamp; and
    (d) outputting the selected frame of data.

14. The method as set forth in claim 13 wherein, for each one of the frames of data in each one of the received instances, step (b) is comprised of one or more of the steps of:
    generating CRC success indication data bits;
    generating Yamamoto success indication data bits; and
    generating signal error rate data bits.

15. The method as set forth in claim 14 wherein, for each one of the frames of data in each one of the received instances, step (b) includes the step of:

assembling a combined quality metric by combining the CRC success indication data bits, if generated, with the Yamamoto success indication data bits, if generated, and with the signal error rate data bits, if generated.

16. The method as set forth in claim 15 wherein, for each one of the frames of data in each one of the received instances, the step of assembling a combined quality metric includes the step of:

inserting the CRC success indication data bits, if generated, into a most significant bit portion of a combined quality metric data field;

inserting the Yamamoto success indication data bits, if generated, into a middle bit portion of the combined quality metric data field; and inserting the signal error rate data bits, if generated, into a least significant bit portion of the combined quality metric data field.

17. The method as set forth in claim 13 wherein step (c) is comprised of the step of:

selecting the one frame having the highest quality metric.

18. A system for receiving a sequence of frames of data transmitted over multiple links comprising:

a receiver that receives multiple instances of the transmitted sequence of frames of data and encodes a time stamp into each one of the frames of data in each one of the received instances;

a quality metric calculation unit that calculates a quality metric for each one of the frames of data in each one of the received instances;

a selection unit that selects only one of the frames of data having the same time stamp based on the quality metrics for the frames of data having the same time stamp; and an output unit that outputs only the selected frame of data.

19. The system as set forth in claim 18 wherein, for each one of the frames of data in each one of the received instances, the quality metric calculation unit calculates one or more of:

CRC success indication data bits;

Yamamoto success indication data bits; and signal error rate data bits.

20. The system set forth in claim 19 wherein, for each one of the frames of data in each one of the received instances, the quality metric calculation unit assembles a combined quality metric by combining the CRC success indication data bits, if generated, with the Yamamoto success indication data bits, if generated, and with the signal error rate data bits, if generated.

21. The system as set forth in claim 20 wherein, for each one of the frames of data in each one of the received instances, the quality metric calculation unit assembles a combined quality metric by inserting the CRC success indication data bits, if generated, into a most significant bit portion of a combined quality metric data field;

inserting the Yamamoto success indication data bits, if generated, into a middle bit portion of the combined quality metric data field; and inserting the signal error rate data bits, if generated, into a least significant bit portion of the combined quality metric data field.

22. The system as set forth in claim 18 wherein the selection unit selects the one frame having the highest quality metric.

23. A cellular telephone system comprising:

a cellular telephone generating and transmitting a sequence of frames of data using radio frequency signals;

a plurality of base stations each receiving the sequence of frames of data, encoding a time stamp into each of the received frames of data, generating a corresponding frame quality metric for each of the received frames of data, and outputting the sequence of the received frames of data and the corresponding frame quality metrics; and a base station controller receiving multiple instances of the sequences of frames of data and the corresponding frame quality metrics from the plurality of base stations, selecting for each received frame of data having the same time stamp only one instance of the frame of data based on the quality metrics of the instances of the frame of data having the same time stamp, and outputting only the selected instance of the frame of data.

24. The cellular telephone system as set forth in claim 23 wherein each base station calculates quality metrics by generating one or more of:

CRC success indication data bits;

Yamamoto success indication data bits; and signal error rate data bits, for each frame.

25. The cellular telephone system as set forth in claim 24 wherein the base stations additionally assemble combined quality metrics for each frame by combining the CRC success indication data bits, if generated, with the Yamamoto success indication data bits, if generated, and with the signal error rate data bits, if generated.

26. The cellular telephone system as set forth in claim 25 wherein the base stations assemble the combined quality metrics by inserting the CRC success indication data bits, if generated, into a most significant bit portion of a combined quality metric data field;

inserting the Yamamoto success indication data bits, if generated, into a middle bit portion of the combined quality metric data field; and inserting the signal error rate data bits, if generated, into a least significant bit portion of the combined quality metric data field.

27. The cellular telephone system as set forth in claim 23 wherein the cellular telephone encodes CRC check sum bits into at least some of the frames of data.

28. The cellular telephone system as set forth in claim 23 wherein the base station controller selects the instance of the frame of data having the highest quality metric.

* * * * *